United States Patent [19]

Leach

[11] 4,172,519

[45] Oct. 30, 1979

[54] ARTICLE ACCUMULATION CONVEYOR

[76] Inventor: John M. Leach, Box 341, Port Jefferson, N.Y. 11777

[21] Appl. No.: 889,485

[22] Filed: Mar. 23, 1978

[51] Int. Cl.² .............................................. B65G 13/07
[52] U.S. Cl. ...................................... 198/781; 192/28; 198/791
[58] Field of Search ............... 198/781, 789, 790, 791; 192/28; 74/243 R, 243 C, 243 FC

[56] References Cited
U.S. PATENT DOCUMENTS

| | | | |
|---|---|---|---|
| 3,170,561 | 2/1965 | Schneider | 198/781 |
| 3,253,697 | 5/1966 | De Good et al. | 198/781 |
| 3,400,806 | 9/1968 | Leach | 198/781 |
| 3,729,088 | 4/1973 | Stein et al. | 198/781 |
| 4,121,709 | 10/1978 | Gebhardt | 198/781 |

Primary Examiner—James L. Rowland

[57] ABSTRACT

An article accumulation conveyor in which the drive for moving the articles is automatically discontinued for a selected section of the conveyor when an article is stopped on another certain section of the conveyor and is started again automatically when the article moves. The power for activating the stopping and starting instrumentalities is furnished in its entirety by the conveyor drive so that all need for extraneous power sources or force exerted by a moving article is entirely eliminated.

11 Claims, 4 Drawing Figures

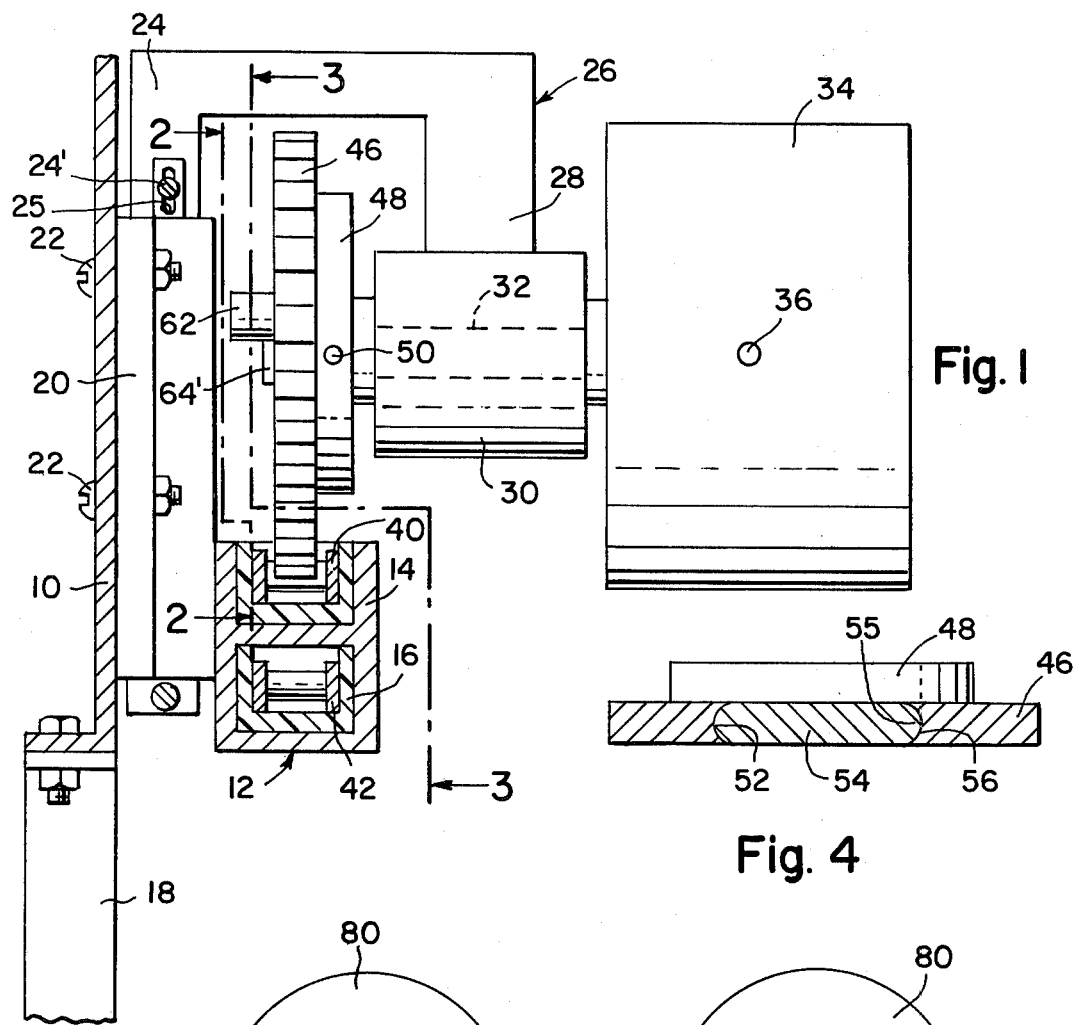
Fig. 1
Fig. 4
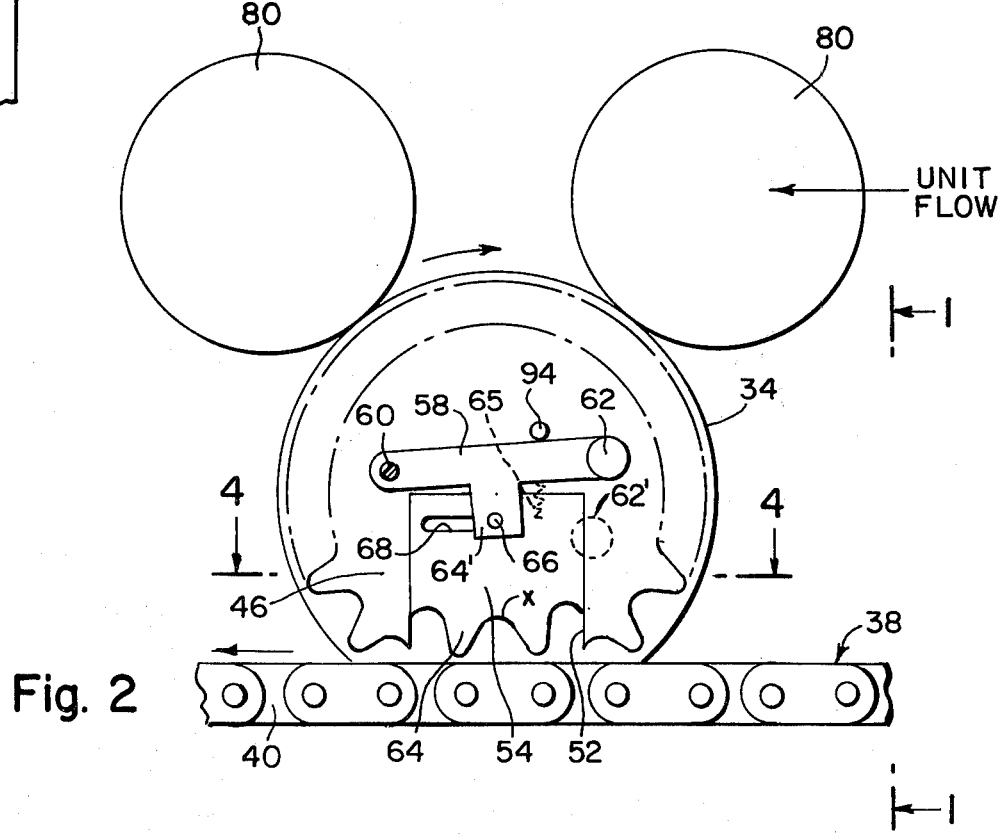
Fig. 2

ARTICLE ACCUMULATION CONVEYOR

BACKGROUND OF THE INVENTION

In the accumulation conveyor field it has long been desired to have a unit which can handle large, heavy articles and small light articles on the same unit.

In prior accumulation conveyors where the force required to discontinue the conveyor drive when an article was stopped on the unit and to start the drive when the stopped article again moved has been provided by a sensor operated either by the weight or the movement of an article or both.

This meant that small, light articles could not operate a clutch or the like of sufficiently heavy duty for the conveyance of heavy articles so that light and heavy articles could not be mixed unless some extraneous power source such as air or electricity was resorted to which required complicated mechanism and was expensive and required space and much maintenace. An example of such a unit is disclosed by U.S. Pat. No. 3,225,893.

Efforts have been made to produce accumulation conveyors in which the power required to operate the clutches to discontinue and then continue the movement of the articles is provided by the conveyor drive which moves the articles conveyed, but such equipment to date has been so complicated as to be prohibitively expensive, undependable or require extensive adjustment or maintenance or all of these undesirable factors.

Examples of such units are disclosed by U.S. Pat. Nos. 3,219,172; 3,285,391; 3,156,345; 3,116,823; 3,164,246; 3,206,008; 3,136,406; and 3,232,415.

SUMMARY OF THE INVENTION

It is an object of the present invention to provide an article accumulation conveyor in which light and/or small and heavy and/or large articles can be intermixed at will on the conveyor without any untoward results and conveyed with full dexterity and freedom from trouble.

It is a further object of the present invention to provide an article accumulation conveyor in which the power required to discontinue and continue drive from the main conveyance is taken from the main conveyance itself.

It is another object of the present invention to provide a power take-off from the main conveyance itself which is simple, dependable and inexpensive and adds very few additional parts to the basic conveyor itself.

Other objects and advantages of the present invention will be apparent to those skilled in the art upon recourse to the following specifications, claims and drawings.

The present invention is an improvement upon the inventions disclosed in this applicant's prior U.S. Pat. Nos. 3,400,806; 3,451,527; and 3,589,496.

BRIEF DESCRIPTION OF THE DRAWINGS

FIG. 1 is a sectional view taken substantially on line 1—1 of FIG. 2 and looking in the direction of the arrows, and with some parts removed to promote clarity.

FIG. 2 is a sectional view taken substantially on line 2—2 of FIG. 1 and looking in the direction of the arrows.

FIG. 4 is a sectional view taken substantially on line 4—4 of FIG. 2 and looking in the direction of the arrows.

DESCRIPTION OF THE PREFERRED EMBODIMENTS OF THE INVENTION

Figure 3:
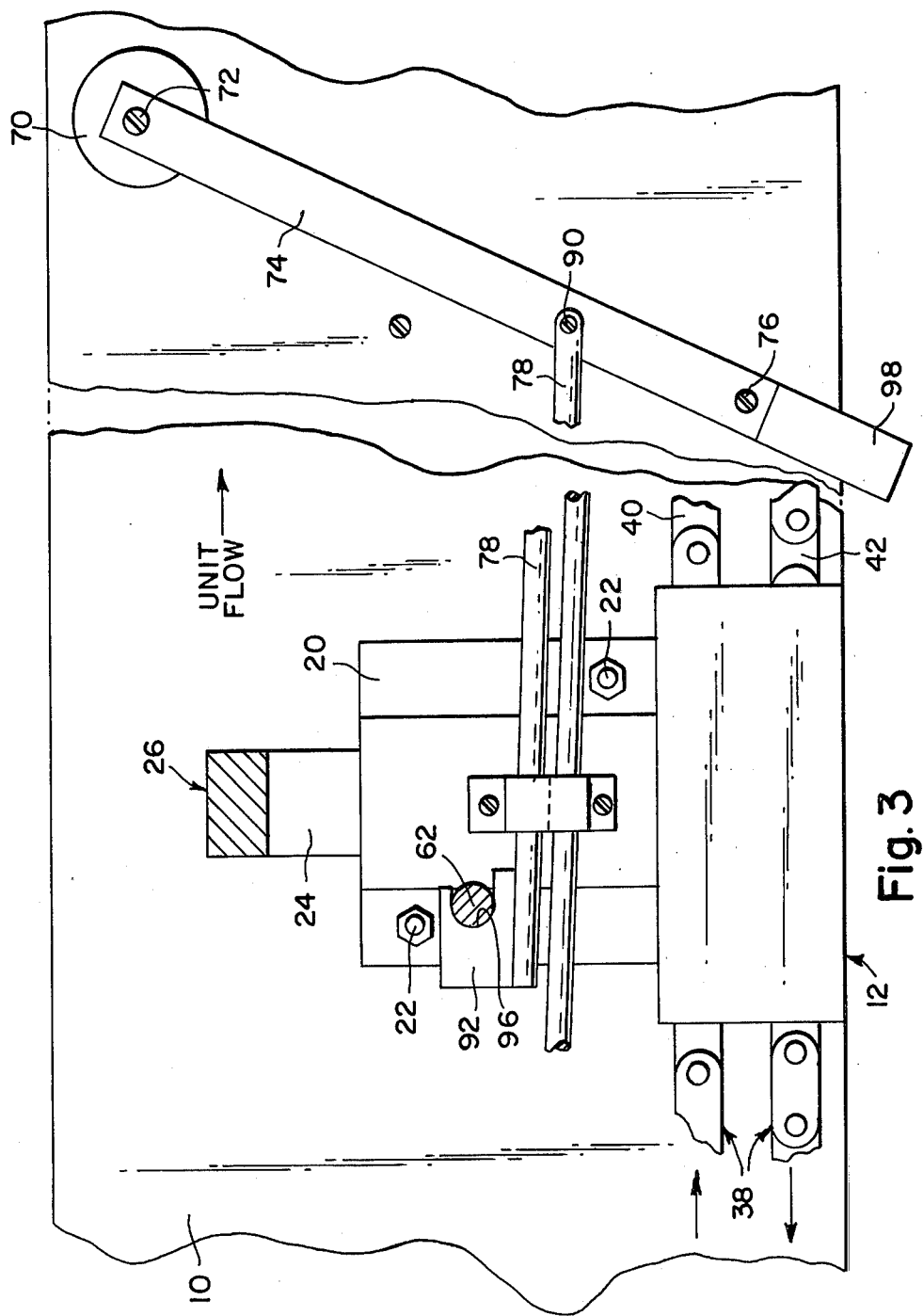
FIG. 3 is a sectional view taken substantially on line 3—3 of FIG. 2 and looking in the direction of the arrows.

The frame of the accumulation conveyor of the present invention is essentially the same as that shown in Applicant's prior U.S. Pat. No. 3,589,496 and consists of two side rails 10 supported by legs 18 and provided with article supporting and moving elements in the form of rollers 80 suitably mounted for free rotation.

At a distance below the rollers 80 a powered driving element is positioned and which can be a band, belt, cable, chain or any equivalent element, but in this application a roller chain 38 is preferred. The chain 38 is carried by a series of guides 12 each of which comprise a guide 14 provided with a low friction liner 16 preferably formed of a plastic such as a silicone within which the chain freely slides. Such a guide 12 is provided for the top run 40 as well as the return run 42 of the chain 38. The chain 38 is suitably driven by any conventional motor-gear reducer drive preferably at an end and provided with a screw take-up at the other end.

This is standard equipment and forms no novel part, per se, of the present invention.

At any desired intervals along the length of the conveyor frame, as a practical matter but not a necessity, at points between two rollers 80 so that two rollers can be accomodated instead of only one roller, bracket sockets 20 are suitably attached to a side rail rail 10 as by bolts 22. Each of the sockets 20 receives one leg 24 of a bracket 26 in a freely slidable, non-rotatable relationship so that the bracket provides a solid, sturdy but easily vertically only moved support for a movement transmission means to transmit movement from the chain 38 to the roller 80. The other leg 28 of the bracket 26 suitably carries at its lower extremity a boss 30 which is suitably bored and sleeved to provide a bearing for a shaft 32. A roller 34 is suitably fastened for rotation with the shaft 32 as by a through pin 36.

The roller 34, when in the position shown in FIG. 2, contacts two of the rollers 80 and rotates them when it is driven as will be described later. To provide a good contact with the rollers 80 the roller 34 is preferably provided with a friction surface in any desired and well known manner.

The opposite end of the shaft 32 carries a sprocket 46 provided with a hub 48 and is also suitably fastened for rotation with the shaft 32 as by a through pin 50. By this arrangement the bracket 26 holds the sprocket 46 in position to mesh with the top run 40 of the chain 38 and thus be rotated as the chain 38 is moved along by its drive as above explained.

The sprocket 46 is provided with a substantially rectangularly shaped opening 52 which does not extend into the boss 48. A panel 54 slidably fits into this opening 52 and is prevented from side movement as by rounding the sides of the panel as shown at 55 to fit into the rounded guide surfaces 56 found in the sprocket 46 as shown in FIG. 4. Other guide shapes may be used as desired. Sprocket teeth are formed on the outermost end of panel 54 in pitched sequence to the teeth on the sprocket 46 so that when the panel 54 is in its lowered position, its teeth and the sprocket teeth form a normally continuous circular edge contour rotatable driving member interposed between the rollers 80 and the chain run 40 which forms a continuously movable powered driving element. It can be seen that when the panel 54 is raised this normally continuous circular edge contour is physically changed or interrupted.

To manipulate the slide panel 54 a lever 58 is suitably pivoted to the slide panel 54 as by the shouldered screw 60 and is provided at its opposite end with a stud 62' and with a depending lug 64' having an inwardly extending pin 66 which fits into an inset slot 68 cut in the slide panel 54. It can be seen that moving the stud 62 downwardly or clockwise the slide panel 54 will be moved downwardly also until the pin 66 reaches the left end of the slot 68 at which time the stud 62 will be at the position indicated by dotted line circle 62' shown in FIG. 2 and the tooth segments thereof shown at 64 in FIG. 2 will be in pitch registration with the pitch diameter circle of sprocket 46. This is the normal drive position of the guide panel 54 and in this position the movement of chain run 40 will drive the sprocket 46 just like the slide 54 does not exist because the weight of the sprocket assembly including the sprocket 46, slide panel 54 and lever 58 creates enough centrifugal force to maintain the tooth segments 64 in pitch registration position with the teeth on sprocket 46 and the roller 34 will rotate the rollers 80 and move all of the articles present along the conveyor.

Referring now to FIG. 3, a section of a side rail 10 of the conveyor frame is shown in part. A sensor roller 70 is shown as pivoted by a shoulder screw 72 or the like to an arm 74 which is in turn pivoted to the inside of the rail 10 by a shoulder screw 76. It is to be understood that the roller 70 there shown in its depressed position from having been contacted by a conveyed article which was in some manner stopped while in contact with the roller 70. This means that it is desired at this point to stop the movement of the next article behind the stopped article so that the rollers 80 just under that article must not be rotated further. To this end the connecting rod 78 suitably pivoted to the arm 74 by the shoulder screw 90 has been moved to the right as viewed in FIG. 3. This movement carried the stop 92 carried by the left end of rod 78 into position to intercept and stop the stud 62 carried by the lever 58 as shown in FIG. 2. It will be understood that stud 62 was in the position relative to the slide panel 54 shown at 62' in dotted lines in FIG. 2 when the stop 92 was pushed into position by the connecting rod 78 caused by movement of lever 74 when the article contacted roller 70. The sprocket 46 continued rotating under the force of momentum which raised the stud 62, the arm 58, the lug 64' and the pin 66 which raised the slide panel 54 until the lever arm 58 was stopped by the pin 94 carried by sprocket 46 and at the same instant the stud 62 seated into the recess 96 in the stop 92. This raising of the lever arm 58 raised the panel slide 54 and gradually withdrew the teeth at the lower end of the slide panel 54 from the chain run 40. A pin 94 carried by the sprocket 46 limits the movement of the lever arm 58 just as the stud 62 seats in the pocket 96 where it is held until the connector is moved to left as viewed in FIG. 3.

When the slide panel is in this raised position there are no teeth in contact with the chain run 40 so that there is no movement of the sprocket 46, the drive roller 34 or the roller 80 so there is no movement of any article resting on the rollers 80.

During the raising of the slide panel 54 by the lever arm 58 it will be noted that absolutely all the force so expended was furnished by the rotation of sprocket 46 while driven by the chain run 40 and absolutely no raising force was expended by the connecting rod 78 of the article sensor assembly including the sensor roller 70 so that contact of even the lightest article with roller 70 will furnish the very small movement required to move the stop 92 into position to intercept the stud 62 of sprocket 46. Any well known type of mechanical, electrical, fluid or other type of linkage may be substituted for the rod 78.

Arm 74 is caused to return to vertical position when the article in contact with the roller 70 moves on along the conveyor or is otherwise removed, by the weight 98, suitably carried at its lower end and the resulting movement of the stop 92 will release the stud 62 and the weight of the lower arm 58 and the slide panel 54 will cause the slide panel to move down so that the teeth 64 will engage with the run 40 of the chain and initiate the continued conveyance of the article by the driving of the roller 80 through the drive roller 34, sprocket 46 and chain run 40.

The centrifugal force caused by the mass of the slide panel 54, the lower arm 58 and the stud 62 will retain the teeth 64 in driving position during rotation of the sprocket 46. This centrifugal force can be increased if ever desired by the addition of weights and/or springs to the slide panel in any well understood manner. The simplest form would be a coil spring 65 inserted in aligned holes in sprocket 46 and slide panel 54 as shown in dotted lines in FIG. 2.

It will be understood that the resistance to upward movement caused by the weight of the slide panel 54, etc. will serve as a cushion to the stopping of the sprocket 46 by the stud 62-stop 92 interception as above described.

By suitably adjusting the amount of weight 98 in any of the many well known manners the amount of force required for any article to move roller 70 just enough to overcome the delicate weight balance thus established can be reduced to approximately a gram.

In the operation just described the adjustment of 24, FIG. 1, was such that the bracket 26 did not move downwardly at all when the slide panel 54 was raised by an article contacting sensor roll 70. The drive roller 34 remained in tight driving contact with the rollers 80 which caused the rollers 80 to stop along with the drive roller 34 and sprocket 46 and the article on or contacting the roll 70 also stopped if an article ahead was stopped which also stopped the article directly behind the article on or contacting roll 70. This prevented any coasting of the non-driven articles together so as to guarantee absolute "no pressure" or even touching accumulation, as distinguished from "limited pressure" accumulation frequently industrially encountered in which at times the "limited" figure reaches limitless proportions. However, when very light article contact accumulation is desired, as is frequently required because users wish to use all of the space on the conveyors and leave no spaces between the articles, a very quick and simple adjustment of 24 can be made. This adjustment consists of loosening the screw 24' and raising the slide 25 so that the sprocket will be lowered just slightly to break contact between the roller 34 and the roller 80 when the slide panel 54 is down when the tooth roots x are resting on the chain run 40 rollers. This means that when sprocket 46 is stopped by the stop 92 contacting the sprocket stud 62, the roller 80 will not contact roller 34 and will be free to rotate and the articles coast lightly into contact. When the stop 92 is moved out of contact with the stud 62, the teeth 64 of the slide panel 54 will move down into contact with the chain run 40 and rotate the sprocket and the roots of the sprocket teeth contacting the chain 38 roller will raise the sprocket 46 and the roller 34 so that the latter will rise the slight amount to contact and drive the roller 80 and move the articles thereon. The slide panel 54 will move outwardly very slightly so that the pitch circle of sprocket 46 will maintain its continuity due to centrifugal force until the sprocket 46 is again stopped. This ensures quiet operation of the conveyor because the slide panel 54 can not move in and out during operation.

It will be noted that during stopping of the sprocket 46 the upward movement of the slide panel 54 by the lever arm 58 produces a cushioning for the stoppage forces. During operation of the accumulation conveyor of the present invention if it should be so desired the linkage disclosed in U.S. Pat. No. 3,537,568 may be substituted for the connecting rod 78 to inactivate any of the drive stoppage functions of the present invention by any article when no article is stopped just ahead of it.

The foregoing is to be considered as descriptive of the now preferred embodiment of the present invention and not limitative as many changes and modifications can be effected without departing from the basic, inventive concept.

The invention having been described, what is claimed is:

1. A conveyor for articles comprising a frame, rotatable article supporting and moving elements mounted on said frame, a powered driving element continuously movable in a given path always free of contact both with said rotatable article supporting and moving elements and the articles being conveyed, movement transmission means for transferring movement from said powered driving element to at least one of said article supporting and moving elements including a rotatable member having a continuous contact driving edge contour in contact with said powered driving element and said at least one article supporting and moving elements, and means for physically and temporarily removing a section of the said continous contact driving edge contour of said rotatable member relative to the remainder of said rotatable member when an article stops on said article supporting and moving elements to discontinue said movement transferring function of said movement transmission means.

2. A conveyor as specified in claim 1 in which said means for physically and temporarily removing a section of said continuous contact driving edge contour of said rotatable member is actuated by said powered driving element.

3. A conveyor as specified in claim 2 in which said means for physically and temporarily removing a section of the said continuous contact driving edge contour of said rotatable member includes a sensor means operated by a stopped article on the conveyor which initiates the actuation of the said edge section removing means by said powered driving member.

4. A conveyor as specified in claim 3 in which a means is provided for returning the removed edge contour section to its original position in the then continuous periphery of said rotating member, and means when said stopped article moves to initiate the action of the removed section return means.

5. A conveyor as specified in claim 4 in which said rotatable member is a sprocket and said powered driving element is a power driven chain in which said sprocket meshes.

6. A conveyor as specified in claim 5 in which said sprocket has a movable peripheral edge segment.

7. A conveyor as specified in claim 6 in which said edge segment is movable radially of said sprocket.

8. A conveyor as specified in claim 7 in which radial movement of said sprocket segment is motivated by movement of said sprocket.

9. A conveyor as specified in claim 8 in which radial movement of said sprocket segment is triggered by said sensor means.

10. A conveyor as specified in claim 9 in which the movement of said sprocket segment is also terminated by said sensor means, and means is provided to return said sprocket segment to its normal position in the periphery of said sprocket.

11. A conveyor as specified in claim 1 in which said movement transmission means also includes a roller mounted for movement with said sprocket and which contacts at selected times at least one of said article supporting and moving elements.

* * * * *